United States Patent
Suk

(10) Patent No.: US 8,328,083 B2
(45) Date of Patent: Dec. 11, 2012

(54) POINT-OF-SALE SYSTEM IMPLEMENTING CRITERIA-BASED TRANSACTION TOTALS

(75) Inventor: Alex Suk, Northfield, IL (US)

(73) Assignee: Unicous Marketing Inc., Rosemont, IL (US)

( * ) Notice: Subject to any disclaimer, the term of this patent is extended or adjusted under 35 U.S.C. 154(b) by 1248 days.

(21) Appl. No.: 11/936,643

(22) Filed: Nov. 7, 2007

(65) Prior Publication Data

US 2008/0147504 A1    Jun. 19, 2008

Related U.S. Application Data

(63) Continuation-in-part of application No. 11/893,479, filed on Aug. 16, 2007, now Pat. No. 7,578,435, which is a continuation of application No. 10/772,631, filed on Feb. 5, 2004, now abandoned.

(60) Provisional application No. 60/864,727, filed on Nov. 7, 2006.

(51) Int. Cl.
*G07F 19/00* (2006.01)

(52) U.S. Cl. .................. 235/379; 235/383

(58) Field of Classification Search .......... 235/379, 235/383, 375, 380, 385
See application file for complete search history.

(56) References Cited

U.S. PATENT DOCUMENTS

| | | | |
|---|---|---|---|
| RE34,915 E | 4/1995 | Nichtberger | |
| 5,513,102 A | 4/1996 | Auriemma | |
| 5,644,723 A | 7/1997 | Deaton | |
| 5,857,175 A | 1/1999 | Day | |
| 5,945,653 A | 8/1999 | Walker | |
| 6,041,309 A | 3/2000 | Laor | |
| 6,076,069 A | 6/2000 | Laor | |
| 6,112,981 A * | 9/2000 | McCall | 235/375 |
| 6,260,758 B1 | 7/2001 | Blumberg | |
| 6,321,210 B1 | 11/2001 | O'Brien | |
| 6,332,128 B1 | 12/2001 | Nicholson | |
| 6,334,108 B1 | 12/2001 | Deaton | |
| 6,732,081 B2 | 5/2004 | Nicholson | |
| 6,778,967 B1 | 8/2004 | Nicholson | |

(Continued)

FOREIGN PATENT DOCUMENTS

KR    100390531    6/2002

OTHER PUBLICATIONS

International Search Report and Written Opinion for PCT/US2007/083945, Mar. 4, 2008.

(Continued)

*Primary Examiner* — Karl D Frech
(74) *Attorney, Agent, or Firm* — Brad Bertoglio

(57) ABSTRACT

The Present Invention comprises the steps of determining a first transaction total price and a second transaction total price, for which the consumer is eligible upon the satisfaction of certain criteria. The first total transaction price is sent from a cashier terminal to a payment interface. Further information, such as an indication of the method of payment presented to the payment interface, is sent from the payment interface to the cashier terminal. The Present Invention then determines whether the consumer is eligible for the second total transaction price by using the further information to determine if the required criteria is satisfied. If the criteria is satisfied, the cashier terminal then sends the second total price to the payment interface.

11 Claims, 2 Drawing Sheets

U.S. PATENT DOCUMENTS

| | | |
|---|---|---|
| 6,937,995 B1 | 8/2005 | Kepecs |
| 7,188,085 B2 | 3/2007 | Pelletier |
| 7,398,225 B2 | 7/2008 | Voltmer |
| 7,424,441 B2 | 9/2008 | George |
| 2002/0013728 A1 | 1/2002 | Wilkman |
| 2002/0032609 A1 | 3/2002 | Wilkman |
| 2002/0046089 A1 | 4/2002 | Zorn |
| 2002/0049631 A1 | 4/2002 | Williams |
| 2002/0107738 A1 | 8/2002 | Beach |
| 2002/0178060 A1 | 11/2002 | Sheehan |
| 2002/0188509 A1 | 12/2002 | Ariff |
| 2002/0194069 A1 | 12/2002 | Thakur |
| 2003/0028518 A1 | 2/2003 | Mankoff |
| 2003/0029540 A1 | 2/2003 | Stromberg |
| 2003/0130891 A1 | 7/2003 | Jacobs |
| 2003/0158796 A1 | 8/2003 | Balent |
| 2003/0167203 A1 | 9/2003 | Thorne |
| 2003/0195806 A1 | 10/2003 | Willman |
| 2003/0200146 A1 | 10/2003 | Levin |
| 2003/0229540 A1 | 12/2003 | Algiene |
| 2004/0024638 A1 | 2/2004 | Restis |
| 2004/0024703 A1 | 2/2004 | Roskind |
| 2004/0049427 A1 | 3/2004 | Tami |
| 2004/0167821 A1 | 8/2004 | Baumgartner |
| 2005/0160003 A1 | 7/2005 | Berardi |
| 2005/0194454 A1 | 9/2005 | Ferber |
| 2005/0256772 A1 | 11/2005 | Tang |
| 2006/0020512 A1 | 1/2006 | Lucas |
| 2008/0011844 A1* | 1/2008 | Tami et al. .................... 235/385 |

OTHER PUBLICATIONS

International Search Report and Written Opinion for PCT/US2007/083968, Mar. 28, 2008.

* cited by examiner

POINT-OF-SALE SYSTEM IMPLEMENTING CRITERIA-BASED TRANSACTION TOTALS

CROSS REFERENCES TO RELATED APPLICATIONS

The following Co-Pending and commonly assigned U.S. Patent Applications relate to and further describe other aspects of the Present Invention, and are all herein incorporated by reference in their entireties:

U.S. Non-Provisional patent application Ser. No. 10/772,631, entitled "Couponing System," filed on 5 Feb. 1994;

PCT Patent Application No. PCT/US2004/040539, entitled "Couponing System," filed on 12 Dec. 1994;

U.S. Provisional Patent Application No. 60/864,719, entitled "System And Method For Processing Of Electronic Coupons," filed on 7 Nov. 2006;

U.S. Non-Provisional patent application Ser. No. 11/893,479 entitled "Couponing System," filed on 16 Aug. 2007; and U.S. Non-Provisional Patent Application No. 11/936,521, entitled "System and Method For Processing Of Electronic Coupons," filed on 7 Nov. 2007.

Further, the Present Invention claims priority as a Continuation-in-Part to previously filed U.S. Non-Provisional patent application Ser. No. 10/772,631, entitled "Couponing System," filed on 05 Feb. 2004, and Ser. No. 11/893,479, entitled "Couponing System," filed on 16 Aug. 2007. Finally, the Present Invention claims priority to previously-filed U.S. Provisional Patent Application No. 60/864,727, entitled "Point-Of-Sale System Implementing Criteria-Based Transaction Totals," filed on 7 Nov. 2006.

FIELD OF THE PRESENT INVENTION

The Present Invention relates generally to consumer point-of-sale ("POS") systems. The Present Invention is particularly useful in the context of electronic discount and coupon processing systems.

BACKGROUND OF THE PRESENT INVENTION

Most retailers conduct consumer transactions pursuant to electronic point-of-sale ("POS") systems. These systems typically have a cashier terminal, which includes a scanner and a display to show the selling price of a product. The scanner generally used with these POS systems will typically scan a bar code, or other similar indicator identifying the product, through the use of a laser reading device. Typically, the display will illustrate both the individual product cost and a running total cost. Once each product has been processed, or read, in this manner, a consumer can often pay for the products through a payment interface.

Payment interfaces typically allow a consumer to "swipe" a payment card, e.g., a credit or debit card, into an appropriate mechanism on the payment interface. This swiping process more particularly consists of sliding a payment card through a receiving slot disposed on the payment interface such that the payment interface can obtain relevant information from the readable strip of magnetic tape located on the back of the payment card.

Oftentimes, payment interfaces will also have a Personal Identification Number ("PIN") interface, usually in the form of a typepad, that will allow the consumer to input a PIN, verifying that the consumer is the proper holder of the payment card. The payment interface then receives the total transaction amount from the cashier terminal and processes the payment for that amount, directly through the network of the payment card issuer. The payment interface then sends approval back to the cashier terminal, confirming a successful payment transaction. Alternatively, the processing of the payment may occur at the cashier terminal.

Such POS equipment is often configured to allow for the use of conventional paper coupons. The use of conventional paper coupons to market and promote specific products is well known in the consumer sales industry. Conventional paper coupons are commonly distributed by various means, such as newspaper inserts, postal mailings, etc., and are usually structured to provide a consumer with an incentive to buy a particular product.

Coupons provide a discount on the purchase price of a specific product that a manufacturer wants to promote. The discount may be offered, for example, directly by listing the monetary value of the discount on the face of the coupon or indirectly by providing, for example, a percentage—or other—reduction or a premium if the consumer purchases a product (or, in some cases, a collection of products). The premium may be an offer for a second—or subsequent—product at no cost, or the offer of another related (or unrelated) product.

Coupons are sometimes used by manufacturers to promote sales of products that may be overstocked or outdated. Additionally, coupons may be used to promote new products and build brand recognition or share. Finally, coupons allow the manufacturer of a product to offer a particular product at a reduced price without actually changing the list price for that product.

Generally, a merchant provides a coupon incentive to a consumer immediately, such as upon the completion of a sale/purchase transaction of a particular product. In most instances, the coupon incentive has been authorized by the manufacturer of the particular product. Alternatively, the coupon incentive may be authorized by a third party specializing in the sponsorship of coupons. Once a merchant accepts a coupon from a consumer relating to a product, the merchant may then redeem the coupon for cash or other consideration from the manufacturer. Because a merchant will commonly redeem a large number of coupons from a wide variety of manufacturers, coupon clearinghouses are usually employed to sort, separate, count and authenticate the coupons, as well as to submit each coupon to its authorizer/sponsor for reimbursement, and distribute at least a portion of the reimbursement back to the merchant. In many cases, the coupon clearinghouse will usually collect a commission, and reduce the reimbursement by this commission, based upon the value of the redeemed coupons.

Unfortunately, currently-known paper coupon redemption systems comprise a very labor intensive process for both the manufacturer and the merchant. Additionally, the merchant must not only accept and grant credit for the coupons, but must also accept responsibility for physically transferring the coupons to a coupon clearinghouse.

Additionally, while conventional paper coupons may be effective in helping manufacturers dispose of merchandise, promote sales of overstocked or outdated products, promote new products and/or build brand recognition, the handling of such conventional paper coupons is burdensome and commonly subject to fraud, since conventional paper coupons may be easily duplicated, and the current system does not audit satisfactorily whether the conventional paper coupons were actually used by consumers in connection with the sale/purchase transaction for which the conventional paper coupons were issued.

Further, currently-known paper coupon redemption systems used in most merchant/retailer transactions validate conventional paper coupons by verifying that the Universal Product Code ("UPC") associated with a product belongs to a family of products (defined by the manufacturer). In this situation, the merchant is ultimately responsible for maintaining accurate family codes on their POS system. As a result of this burden, some merchants have been typically known to bypass the family code portion of the validation process and only validate that the product is from an associated manufacturer.

Finally, in the circumstance where the brand of a particular product changes ownership from one manufacturer to another, the associated UPC is required to be changed. This leads to a situation which could be confusing to a consumer: Two different coupons are issued for one product, one from each manufacturer. Alternatively, to avoid this consumer confusion (as well as any accounting reconciliation), the new manufacturer is required to wait until the distribution channels have cleared before offering a coupon.

Accordingly, it is desirable to provide coupons or other product-based discounts that are not directly tied to the presentation and redemption of conventional paper coupons. For example, it is desirable to provide product-based discounts that are automatically applied depending upon various criteria, such as the form of payment presented by the consumer. This may, for example, be employed to encourage consumers to use forms of payment that are less costly to the merchant. Payment-method-discount-eligibility can also be used by payment card issuers to encourage consumers to pay with the issuer's card. However, in conventional POS systems, the payment interface does not enable payment totals to be automatically revised based on criteria such as form of payment, thus preventing the merchant from reliably and transparently using payment type as a discount criteria.

SUMMARY OF THE PRESENT INVENTION

In general, the Present Invention relates to a method and system for completing a retail transaction involving the purchase of one or more products by a consumer. The Present Invention comprises the steps of determining a first transaction total price and a second transaction total price, for which the consumer is eligible upon the satisfaction of certain criteria. The first total transaction price is sent from a cashier terminal to a payment interface. Further information, such as an indication of the method of payment presented to the payment interface, is sent from the payment interface to the cashier terminal. The Present Invention then determines whether the consumer is eligible for the second total transaction price by using the further information to determine if the required criteria are satisfied. If the criteria are satisfied, the cashier terminal then sends the second total price to the payment interface.

Alternatively, the step of determining the first transaction total price may be implemented by processing a plurality of products by retrieving prices associated with the products and summing the prices in order to obtain the first transaction total price. The step of determining a second total transaction price may be accomplished by retrieving a plurality of individual discounts associated with the purchased products, and subtracting the sum of one or more of the discounts from the first total transaction price in order to obtain the second total transaction price.

In some embodiments, the step of sending further information from the payment interface to the cashier terminal is accomplished by swiping a payment card through a slot interface located on the payment interface, receiving payment method information encoded on the payment card, and sending the payment method information to the cashier terminal.

In some embodiments, the eligible form of payment can be selected from amongst a plurality of payment forms consisting of the eligible form of payment and forms of payment having transaction costs greater than the eligible form of payment. In such implementations, the consumer receives an incentive to utilize a particular form of payment having lower transaction costs than other forms of payment.

The Present Invention, as described herein, can be implemented by a system that includes various means for performing the above-described steps. In one embodiment, the system may comprise a payment interface for obtaining payment information from a consumer, a communication channel for sending information describing the method of payment to a cashier terminal, which then sends a first total price, and a second total price depending upon the customer satisfying predetermined criteria, to the payment interface. The system also includes a data interface, a POS backend and a display.

In some embodiments, the POS backend can be used to retrieve prices and discounts for the items purchased by the consumer. Additionally, the POS backend can also be used to create an electronic file containing an indication of the items purchased by the consumer, the prices associated with each item and any discounts associated with each item that were applied.

DETAILED DESCRIPTION OF THE PRESENT INVENTION

While the Present Invention is susceptible of embodiment in many different forms, there are shown in the Figures, and as will be described in detail herein, several specific embodiments, with the understanding that this disclosure is to be considered as an exemplification of the principles of the Present Invention and is not intended to limit the Present Invention to the illustrated embodiments.

Figure 1:
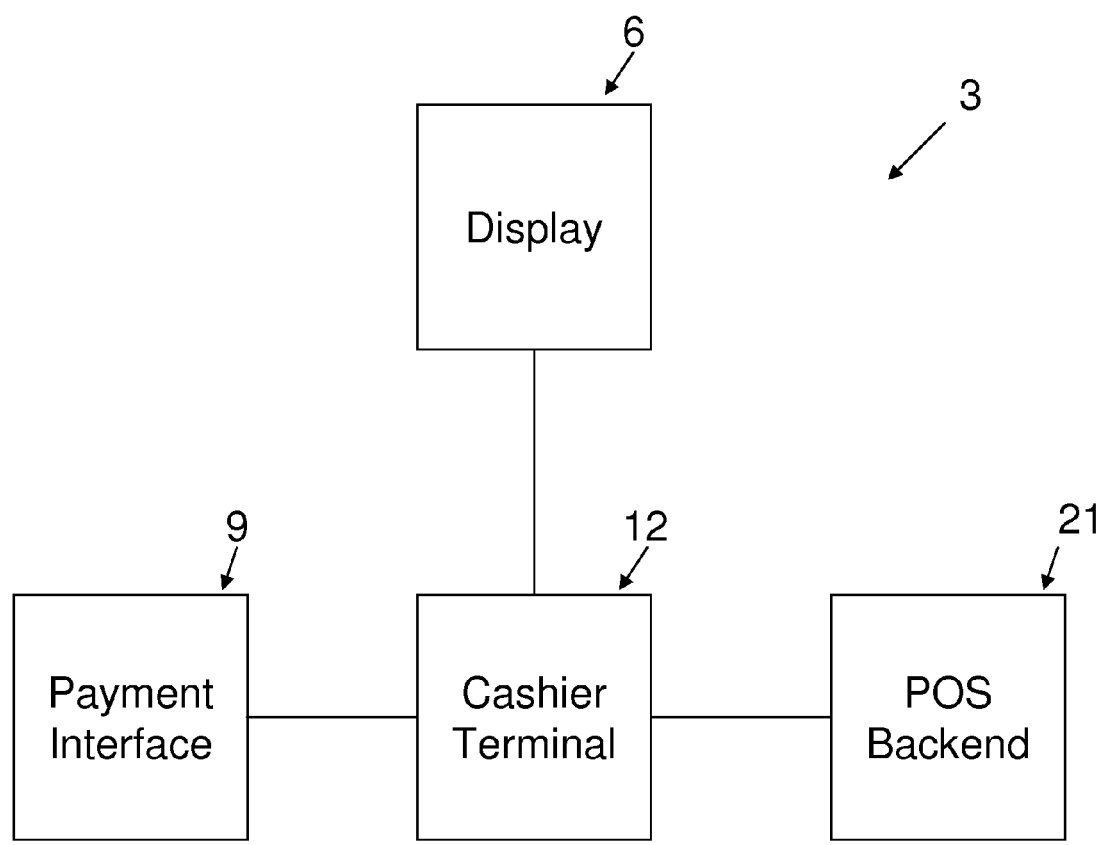
FIG. 1 is a block diagram of a point of sale system implementing criteria-based transaction totals.

As shown in FIG. 1, discount processing system 3 comprises consumer display 6, payment interface 9, cashier terminal 12 and POS backend 21. Cashier terminal 12 may additionally include a scanner, a keypad and a data interface, for interacting with POS backend 21. Further, although POS backend 21 will be described in detail below, it should be noted that POS backend 21 may be used to create an electronic file, or database, containing the products purchased by a consumer, the individual prices associated with the products and any discounts associated with the products.

Figure 2:
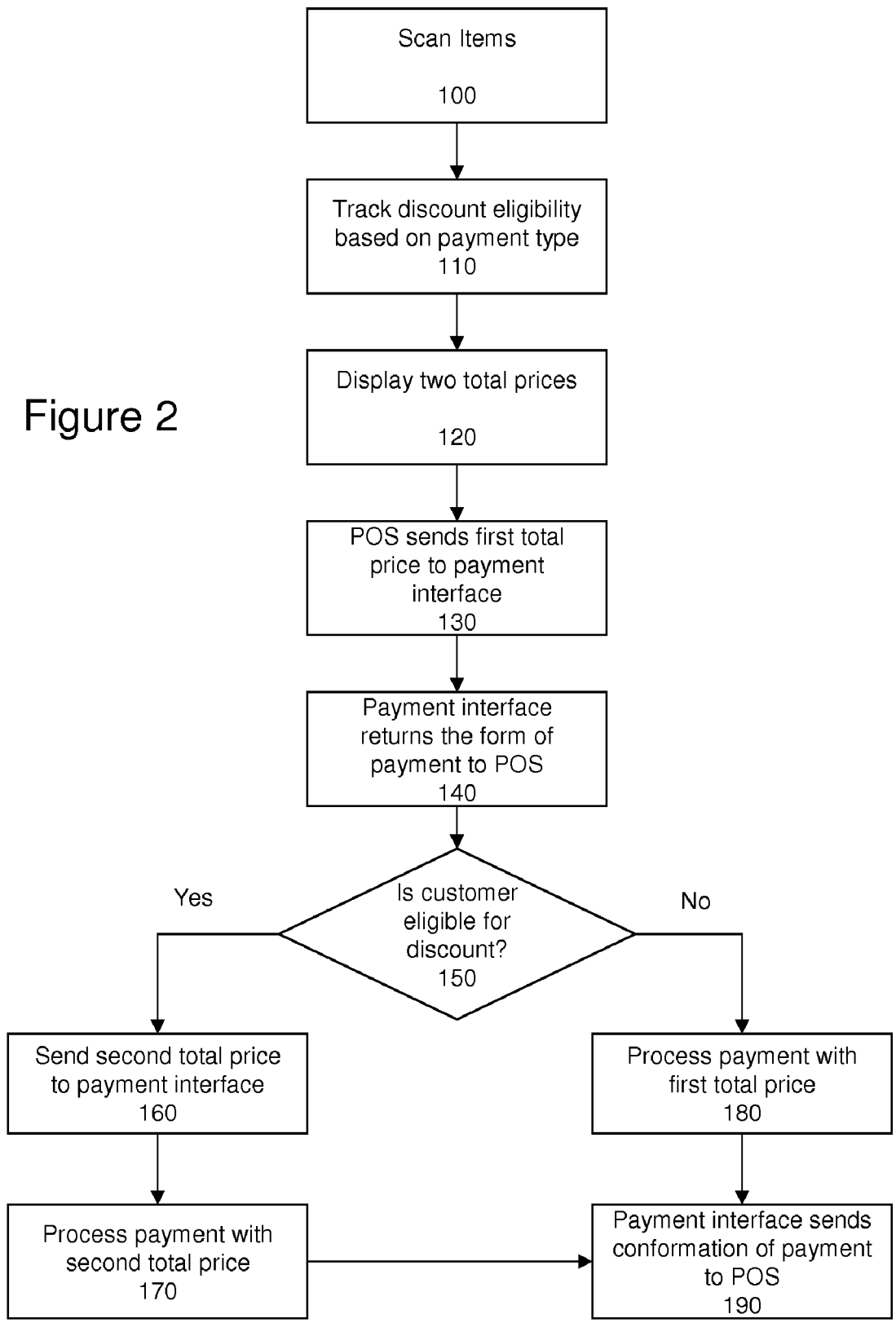
FIG. 2 is a flowchart detailing a method of processing a discount for a customer at a checkout station.

FIG. 2 illustrates one embodiment of the operation of discount processing system 3 of FIG. 1. As shown in FIG. 2, discount processing system 3 allows discounts to be applied to products purchased by a consumer based upon the type of payment chosen by the consumer. This discount is applied through a series of communications between cashier terminal 12 and payment interface 9. Specifically, while the products purchased by a customer items are being processed at cashier terminal 12 (Block 100), cashier terminal 12, through POS backend 21, tabulates the total price for the products in two separate determination processes, one in which a total price is determined with any criteria-based discounts potentially applicable to the transaction, and one in which the total price is determined without such discounts (Block 110).

Preferably, the determination of each of the total prices is made according to the following steps: First, as the consumer scans—or has scanned—each product, discount processing system 3 retrieves the price of each product, through the utilization of a database in which an identifying indicia corresponds to each product. In this instance, the database—or other similar entity—may be located on POS backend 21, which may be accessed through a discount controller. Second, the prices of each product are summed. This results in the first total price, i.e., the total price which is determined without any potentially applicable criteria-based discounts. To achieve the second total price, discount processing system 3 retrieves one or more individual discounts associated with the product and subtracts the sum of the discounts from the first total price to obtain the second total price. Like the database identified above, the retrieval aspect of the second total price may involve access of POS backend 21.

After all products are processed, the consumer is preferably presented with two total prices via consumer display 6: A first total price without the discount, and a second total price applying the discount that would be available if the consumer meets any applicable criteria, such as an eligible form of payment (Block 120).

In Block 130, the first total price is sent to payment interface 9. After the consumer chooses a form of payment and begins the payment transaction, payment interface 9 transmits information indicating the form of payment to cashier terminal 12 (Block 140). Transmittal of the information may occur through the use of swiping a payment card through a slot located on payment interface 9. Payment interface 9 then preferably transmits the information to cashier terminal 12. Alternatively, the slot may be located on cashier terminal 12. In this instance, payment interface 9 does not need to transmit the information to cashier terminal 12.

In Block 150, cashier terminal 12 determines whether the transaction is eligible for a discount based on the payment type presented. For example, if the merchant is able to process debit card transactions less expensively than credit card transactions, the merchant may make the discounts available only to consumers who pay with debit cards.

If the form of payment is eligible for a discount, cashier terminal 12 sends the second total price to payment interface 9 (Block 160). The payment is then processed through the proper networks using the second total price (Block 170). If the consumer chooses not to pay with an eligible form of payment, cashier terminal 12 does not send back a revised total and the first total price is then processed (Block 180). After the payment is processed, payment interface 9 sends confirmation of the payment back to cashier terminal 12 (Block 190), completing the transaction.

The foregoing description and Figures merely explain and illustrate the Present Invention and the Present Invention is not limited thereto, as those skilled in the art, having this disclosure before them will be able to make modifications and variations therein without departing from the scope of the Present Invention.

What is claimed is:

1. A method of completing a retail transaction involving the purchase of one or more items by a customer, the method comprising the steps of:
    determining a first transaction total price;
    determining a second transaction total price; wherein the customer is eligible for the second total price upon satisfying a discount criteria determined at least in part by use of an eligible form of payment;
    sending the first total transaction price from a cashier terminal to a payment interface;
    sending information relating to the discount criteria from the payment interface to the cashier terminal;
    determining whether the customer is eligible for the second total price by using the information relating to the discount criteria to determine if the discount criteria is satisfied; and
    sending the second total price to the payment interface if the discount criteria is satisfied.

2. The method of claim 1, wherein the step of determining a first transaction total price comprises the steps of:
    processing one or more items of a customer purchase by retrieving individual prices associated with each of the one or more items; and
    summing the individual prices in order to obtain the first transaction total price;
    wherein the step of determining a second total transaction price comprises the steps of:
    retrieving one or more individual discounts associated with the one or more items; and
    subtracting the sum of the one or more discounts from the first total transaction price in order to obtain the second total transaction price.

3. The method of claim 1 in which the step of sending the information comprises:
    swiping a payment card through a slot located on the payment interface;
    receiving payment type information, the payment type information being encoded on the payment card indicating the form of payment; and
    sending the payment type information to a cashier terminal.

4. The method of claim 1 wherein the eligible form of payment is selected from amongst a plurality of payment forms, the plurality of payment forms consisting of the eligible from of payment and one ore more other forms of payment having transaction costs greater than the eligible form of payment, whereby the customer receives incentive to utilize a form of payment having lower transaction costs than other forms of payment.

5. A system for completing a retail transaction involving the purchase of one or more items by a customer, the system comprising:
    means for determining a first transaction total price;
    means for determining a second transaction total price, wherein the customer is eligible for the second total price upon satisfying a discount criteria determined at least in part by use of an eligible form of payment;
    means for sending the first total transaction price from a cashier terminal to a payment interface;
    means for sending information relating to the discount criteria from the payment interface to the cashier terminal;
    means for determining whether the customer is eligible for the second total price by using the information to determine if the discount criteria is satisfied; and
    means for sending the second total price to the payment interface if the discount criteria is satisfied.

6. The system of claim 5, wherein the means for determining a first transaction total price comprises:
    means for processing one or more items of a customer by retrieving one or more individual prices associated with the one or more items; and
    means for summing the one or more individual prices in order to obtain the first transaction total price;

wherein the means for determining a second total transaction price comprises:
means for retrieving one or more individual discounts associated with the one or more items; and
means for subtracting the sum of the one or more discounts from the first total transaction price in order to obtain the second total transaction price.

7. The system of claim 5 in which the means for sending the information comprises:
means for receiving payment type information, the payment type information being encoded on the payment card indicating the form of payment; and
a communication interface for sending the payment type information to a cashier terminal.

8. A system for completing a retail transaction involving the purchase of one or more items by a customer, the system comprising:
a payment interface for obtaining payment information from the customer and sending information indicative of the type of payment to a cashier terminal;
said cashier terminal, the cashier terminal for sending a first total price to the payment interface, sending a second total price depending upon the customer satisfying at least a first criteria based on said information indicative of the type of payment, and comprising a data interface with a point of sale backend;
said point of sale backend; and
a display.

9. The system of claim 8 wherein the point of sale backend is used to retrieve one or more individual prices and one or more individual discounts for one or more items purchased by the customer.

10. The system of claim 9 wherein the point of sale backend is also used to create an electronic file containing the one or more items purchased by the customer, the one or more individual prices associated with the one or more items, and the one or more individual discounts associated with the one or more items.

11. The system of claim 10 further comprising a discount controller, the discount controller having a data interface with the point of sale backend.

* * * * *